United States Patent
Takeuchi

(10) Patent No.: US 7,996,692 B2
(45) Date of Patent: Aug. 9, 2011

(54) INFORMATION PROCESSING APPARATUS AND SEMICONDUCTOR INTEGRATED CIRCUIT

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 444 days.

(21) Appl. No.: 12/202,605

(22) Filed: Sep. 2, 2008

(65) Prior Publication Data

US 2009/0063876 A1    Mar. 5, 2009

(30) Foreign Application Priority Data

Sep. 3, 2007  (JP) ................ 2007-227844
May 27, 2008  (JP) ................ 2008-137814

(51) Int. Cl.
*G06F 1/26* (2006.01)
(52) U.S. Cl. .............. 713/300; 713/322; 713/600
(58) Field of Classification Search .......... 713/300, 713/320, 322, 500, 501, 600
See application file for complete search history.

(56) References Cited

U.S. PATENT DOCUMENTS

| | | | |
|---|---|---|---|
| 6,704,875 B1 * | 3/2004 | Kinoshita et al. | 713/300 |
| 7,774,625 B1 * | 8/2010 | Sheng et al. | 713/300 |
| 2003/0052787 A1 * | 3/2003 | Zerhusen et al. | 340/573.1 |
| 2004/0103330 A1 * | 5/2004 | Bonnett | 713/322 |

FOREIGN PATENT DOCUMENTS

| | | |
|---|---|---|
| JP | 02-256311 | 10/1990 |
| JP | 08-044465 | 2/1996 |

* cited by examiner

*Primary Examiner* — Chun Cao
*Assistant Examiner* — Paul B Yanchus, III
(74) *Attorney, Agent, or Firm* — Harness, Dickey & Pierce, P.L.C.

(57) ABSTRACT

The information processing apparatus equipped with a microprocessor is provided. The information processing apparatus equipped with a microprocessor includes: an operation clock signal generator that generates a frequency-variable operation clock signal supplied to the microprocessor; and a power supply voltage generator that determines a value of a power supply voltage to be supplied to the microprocessor according to a logarithm of a frequency of the operation clock signal and generates the power supply voltage.

11 Claims, 15 Drawing Sheets

Fig.4A
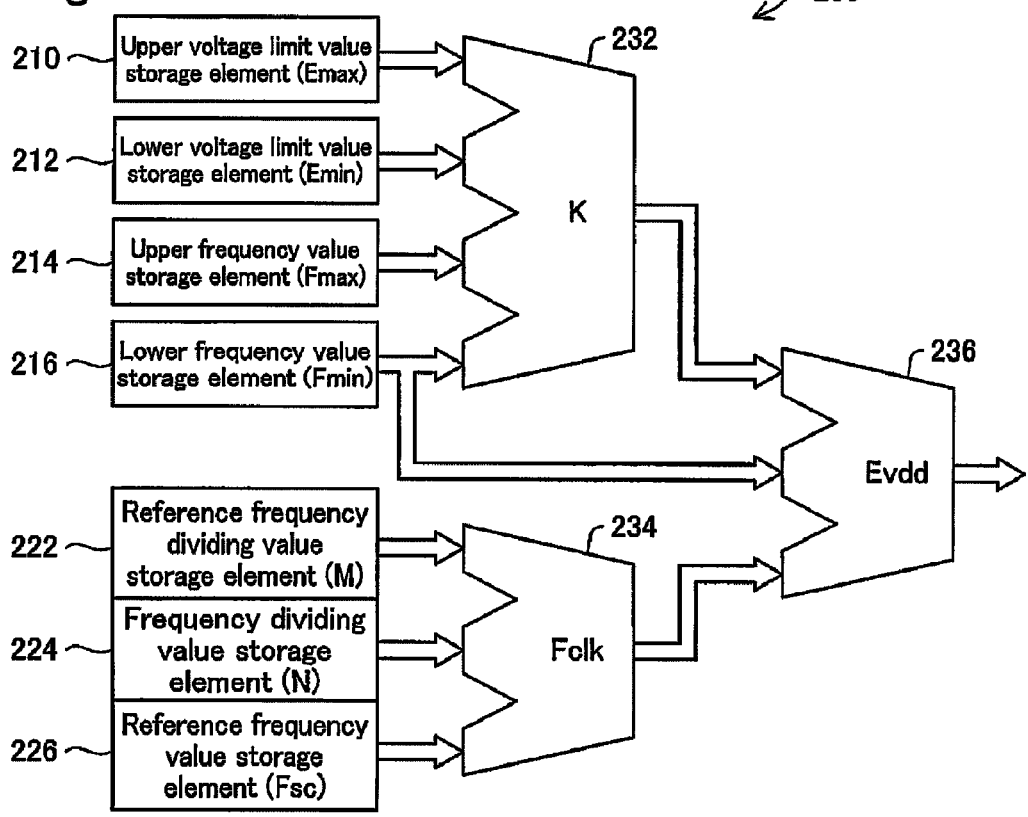
Fig.4B
| | |
|---|---|
| Frequency command value | Fclk=Fsc·N/M |
| Correlation coefficient | K=(Emax−Emin)/(log(Fmax)−log(Fmin)) |
| Set voltage value | Evdd=K·(log(Fclk)−log(Fmin))+Emin |
Fig.4C
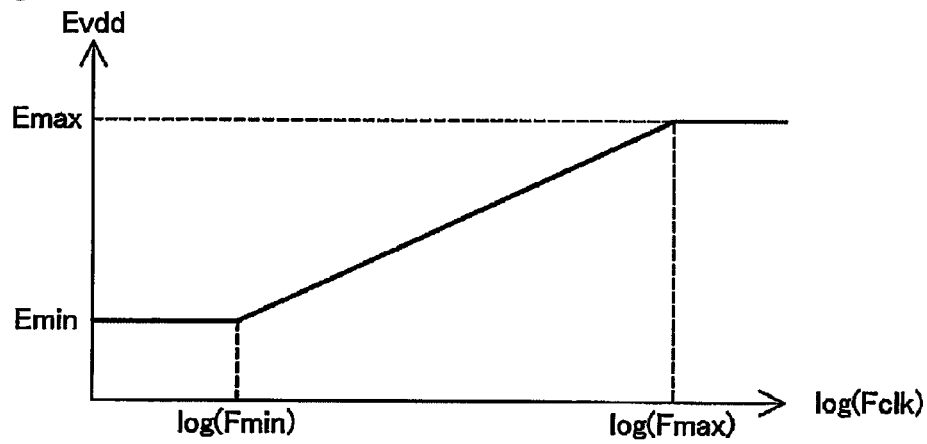

Fig.5

Fmin=1K[Hz]    Emin=0.8[V]
Fmax=1G[Hz]    Emax=5.0[V]

| Fclk[Hz] | log(Fclk) | Evdd[V] |
|---|---|---|
| 1K | 3 | 0.8 |
| 10K | 4 | 1.5 |
| 100K | 5 | 2.2 |
| 1M | 6 | 2.9 |
| 10M | 7 | 3.6 |
| 100M | 8 | 4.3 |
| 1G | 9 | 5.0 |

When Fsc=1M[Hz]

| I/O interrupt | Frequency dividing value M | Frequency dividing value N | Fclk[Hz] | Evdd[V] |
|---|---|---|---|---|
| No | 1000 | 1 | 1K | 0.8 |
| Keyboard | 1000 | 1000 | 1M | 2.9 |
| Audio | 100 | 1000 | 10M | 3.6 |
| Video | 1 | 1000 | 1G | 5.0 |

CPU frequency - power consumption characteristic

| Fclk[Hz] | Evdd[V] | Power consumption [W] (at variable voltage) | Power consumption [W] (at fixed voltage to 5 V) | Reduction rate [%] |
|---|---|---|---|---|
| 1K | 0.8 | 0.15 $\mu$ | 6 $\mu$ | 97 |
| 10K | 1.5 | 5.4 $\mu$ | 60 $\mu$ | 91 |
| 100K | 2.2 | 120 $\mu$ | 600 $\mu$ | 81 |
| 1M | 2.9 | 2.0m | 6.0m | 66 |
| 10M | 3.6 | 31m | 60m | 48 |
| 100M | 4.3 | 440m | 600m | 26 |
| 1G | 5.0 | 6.0 | 6.0 | 0 |

US 7,996,692 B2

INFORMATION PROCESSING APPARATUS AND SEMICONDUCTOR INTEGRATED CIRCUIT

CROSS-REFERENCE TO RELATED APPLICATIONS

The present application claims the priority based on Japanese Patent Applications No. 2007-227844 filed on Sep. 3, 2007, and No. 2008-137814 filed on May 27, 2008, the disclosures of which are hereby incorporated by reference in their entireties.

BACKGROUND OF THE INVENTION

1. Field of the Invention

The present invention relates to an information processing apparatus and a semiconductor integrated circuit with efficient power consumption.

2. Description of the Related Art

A proposed technique relating to the information processing apparatus with efficient power consumption is disclosed in, for example, Japanese Patent Laid-Open No. H08-44465.

The proposed technique changes the frequency of a clock signal supplied to a microprocessor and accordingly changes a supply voltage to the microprocessor. This prior art technique, however, does not fully consider the case of a change in frequency of the clock signal supplied to the microprocessor in a wide frequency range.

SUMMARY

An object of the present invention is to provide technology that is able to adequately determine a value of a power supply voltage to be supplied to a microprocessor even in the case of a change in frequency of an operation clock signal supplied to the microprocessor in a wide frequency range.

According to an aspect of the present invention, an information processing apparatus equipped with a microprocessor is provided. An information processing apparatus equipped with a microprocessor comprises: an operation clock signal generator that generates a frequency-variable operation clock signal supplied to the microprocessor; and a power supply voltage generator that determines a value of a power supply voltage to be supplied to the microprocessor according to a logarithm of a frequency of the operation clock signal and generates the power supply voltage.

The information processing apparatus according to this aspect of the invention enables adequate determination of the value of the power supply voltage to be supplied to the microprocessor, in the case of a change in frequency of the operation clock signal supplied to the microprocessor in a wide frequency range.

The present invention is not restricted to the information processing apparatus or the semiconductor integrated circuit having any of the arrangements described above but may be actualized by diversity of other applications, for example, an information processing method, an information processing system, computer programs configured to actualize any of the information processing apparatus, the semiconductor integrated circuit, the information processing method, and the information processing system, and recording media in which such computer programs are recorded. Other applications of the invention include a motor equipped with the information processing apparatus or with the semiconductor integrated circuit, an electronic device, a projector, a cell phone, a robot, and a moving body equipped with such a motor.

BRIEF DESCRIPTION OF THE DRAWINGS

FIG. 4A is a block diagram showing the internal structure of the power supply voltage controller;

FIG. 4B shows arithmetic expressions in the three operators;

FIG. 4C is a graph showing a variation in set voltage value Evdd against the frequency command value Fclk;

FIG. 5 is a table showing calculation results of the set voltage value Evdd from concrete frequency values substituted in the frequency command value Fclk;

DESCRIPTION OF THE PREFERRED EMBODIMENT

Next, aspects of the present invention will be described in the following order on the basis of embodiments:
A. First Embodiment
B. Second Embodiment
C. Modified Examples

A. First Embodiment

Figure 1:
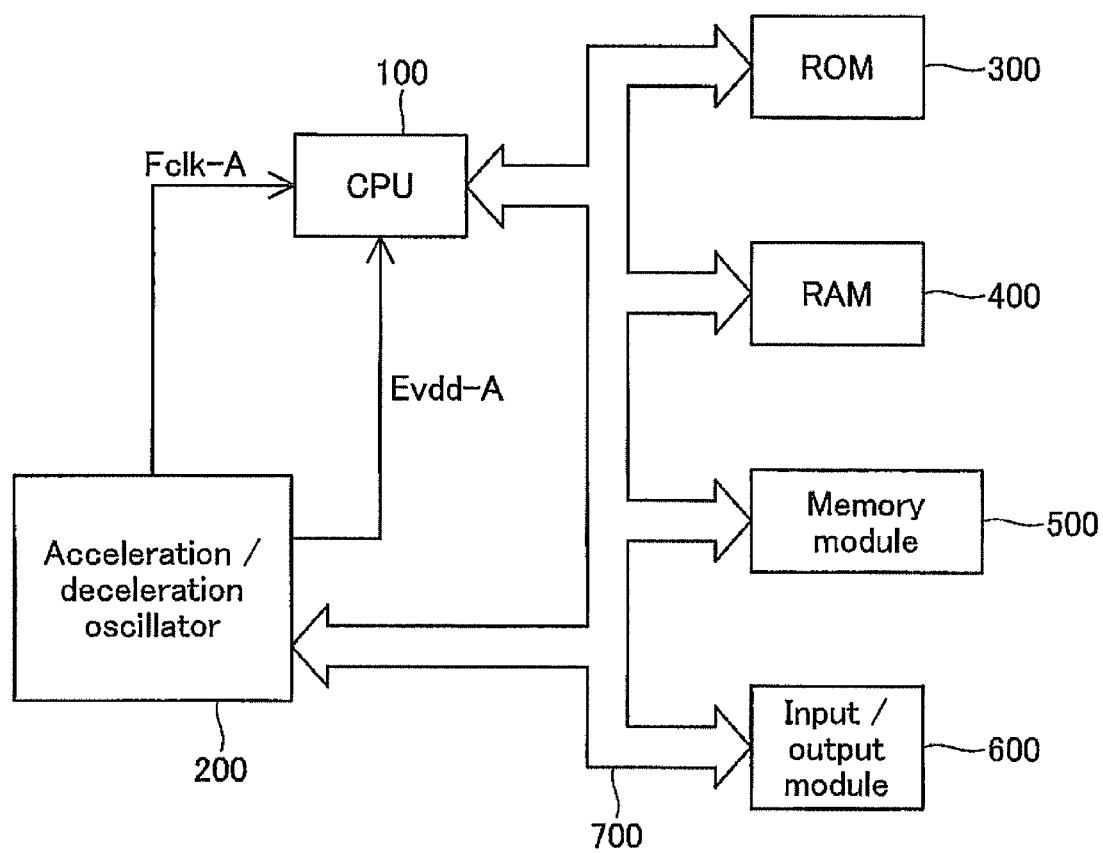
FIG. 1 is a block diagram schematically illustrating the configuration of a computer system in one embodiment of the invention.

FIG. 1 is a block diagram schematically illustrating the configuration of a computer system in one embodiment of the invention. The computer system includes a CPU 100, an acceleration/deceleration oscillator 200, a ROM 300, a RAM 400, a memory module 500, an input-output module 600, and a bus 700. The acceleration/deceleration oscillator 200 generates an operation clock signal Fclk-A for defining synchronization operations of the CPU 100 and supplies the generated operation clock signal Fclk-A to the CPU 100, while generating a power supply voltage Evdd-A to be supplied to the respective circuits (including the CPU 100, the ROM 300, and the RAM 400) of the computer system. The CPU 100 controls the operations of the whole computer system via the bus 700. The input/output module 600 inputs data entered with an input device, such as a keyboard, a mouse, a stylus pen, a touch panel, or a network receiving circuit, while outputting signals to an output device, such as a CRT display or a liquid or another flat display.

Figure 2:
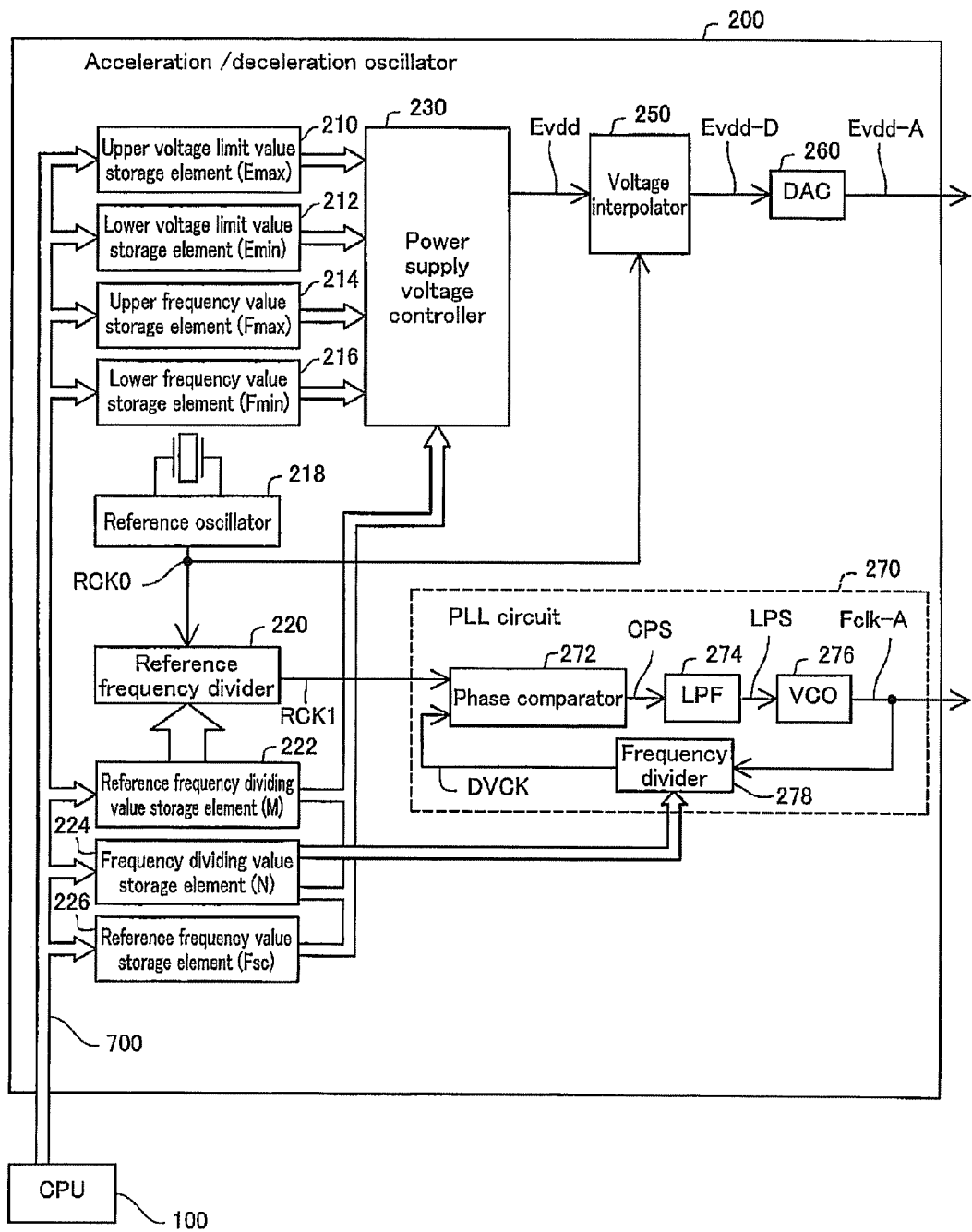
FIG. 2 is a block diagram showing the internal structure of the acceleration/deceleration oscillator in a first embodiment.

FIG. 2 is a block diagram showing the internal structure of the acceleration/deceleration oscillator 200 in a first embodiment. The acceleration/deceleration oscillator 200 includes an upper voltage limit value storage element 210, a lower voltage limit value storage element 212, an upper frequency value storage element 214, a lower frequency value storage element 216, a power supply voltage controller 230, a voltage interpolator 250, a DA converter (DAC) 260, and a reference frequency value storage element 226 as the circuit structure of generating the power supply voltage Evdd-A. The acceleration/deceleration oscillator 200 also includes a reference oscillator 218, a reference frequency divider 220, a PLL circuit 270, a reference frequency dividing value storage element 222, and a frequency dividing value storage element 224 as the circuit structure of generating the operation clock signal Fclk-A. The reference frequency dividing value storage element 222 and the frequency dividing value storage element 224 are also used as part of the circuit structure of generating the power supply voltage Evdd-A. The PLL circuit 270 has a phase comparator 272, a loop filter (LPF) 274, a voltage control oscillator (VCO) 276, and a frequency divider 278.

The upper voltage limit value storage element 210, the lower voltage limit value storage element 212, the upper frequency value storage element 214, and the lower frequency value storage element 216 are connected to the CPU 100 via the bus 700 and respectively store an upper voltage limit value Emax, a lower voltage limit value Emin, an upper frequency value Fmax, and a lower frequency value Fmin set by the CPU 100. The power supply voltage controller 230 outputs a set voltage value Evdd for setting a voltage value of the power supply voltage Evdd-A. The set voltage value Evdd is output as a value in a range defined by the upper voltage limit value Emax as a maximum value and by the lower voltage limit value Emin as a minimum value. The voltage interpolator 250 outputs a set voltage interpolated value Evdd-D based on the set voltage value Evdd. The voltage interpolator 250 may be provided in the power supply voltage controller 230 or may be omitted. The operations of the power supply voltage controller 230 and the voltage interpolator 250 will be described later in detail. The DA converter 260 converts the set voltage interpolated value Evdd-D from its digital signal form to an analog signal form to generate the power supply voltage Evdd-A and supplies the generated power supply voltage Evdd-A to the CPU 100 and the other circuits in the computer system. In a modified structure with omission of the voltage interpolator 250, the DA converter 260 converts the set voltage value Evdd from its digital signal form to an analog signal form to generate the power supply voltage Evdd-A.

The reference frequency dividing value storage element 222 and the frequency dividing value storage element 224 are connected to the CPU 100 via the bus 700 and respectively store a reference frequency dividing value M and a frequency dividing value N set by the CPU 100. The reference oscillator 218 equipped with a quartz crystal or another vibrator generates an original clock signal RCK0. The reference frequency divider 220 makes the original clock signal RCK0 subjected to frequency division by the reference frequency dividing value M stored in the reference frequency dividing value storage element 222 to generate a reference clock signal RCK1.

The reference clock signal RCK1 generated by the reference frequency divider 220 is input as a reference signal to the phase comparator 272. A frequency dividing signal DVCK generated by the frequency divider 278 is input as a comparison signal to the phase comparator 272. The phase comparator 272 generates an error signal CPS representing a phase difference between the two input signals RCK1 and DVCK. The error signal CPS is sent to the loop filter 274 including a charge pump circuit. The charge pump circuit in the loop filter 274 generates and outputs a voltage control signal LPS having a voltage level corresponding to the pulse level and the pulse number of the error signal CPS.

The voltage control oscillator 276 outputs the operation clock signal Fclk-A having an oscillation frequency corresponding to the voltage level of the voltage control signal LPS. The operation clock signal Fclk-A is subjected to 1/N frequency division by the frequency divider 278, based on the frequency dividing value N stored in the frequency dividing value storage element 224. The frequency dividing signal DVCK generated by the frequency divider 278 is input into the phase comparator 272 for the phase comparison with the reference clock signal RCK1 as mentioned above. The frequency of the operation clock signal Fclk-A is converged to make the phase difference between the two input signals RCK1 and DVCK approach to 0. The frequency of the converged operation clock signal Fclk-A is equal to a frequency fRCK1 of the reference clock signal RCK1 multiplied by the frequency dividing value N.

There are following relations between a frequency fRCK0 of the original clock signal RCK0, the frequency fRCK1 of the reference clock signal RCK1, and a frequency fFclk-A of the operation clock signal Fclk-A:

$$fRCK1 = fRCK0/M \quad (1)$$

$$fFclk\text{-}A = N \times fRCK1 = N \times fRCK0/M \quad (2)$$

For example, when fRCK0=1 MHz, M=100, and N=1000, fRCK1=10 KHz and fFclk-A=10 MHz.

The CPU 100 enables the frequency fFclk-A of the operation clock signal Fclk-A to be set sequentially to any desired value by changing the frequency dividing value N stored in the frequency dividing value storage element 224 and the reference frequency dividing value M stored in the reference frequency dividing value storage element 222. This is the advantage of providing the frequency dividing value storage element 224 and the reference frequency dividing value storage element 222.

Figure 3:
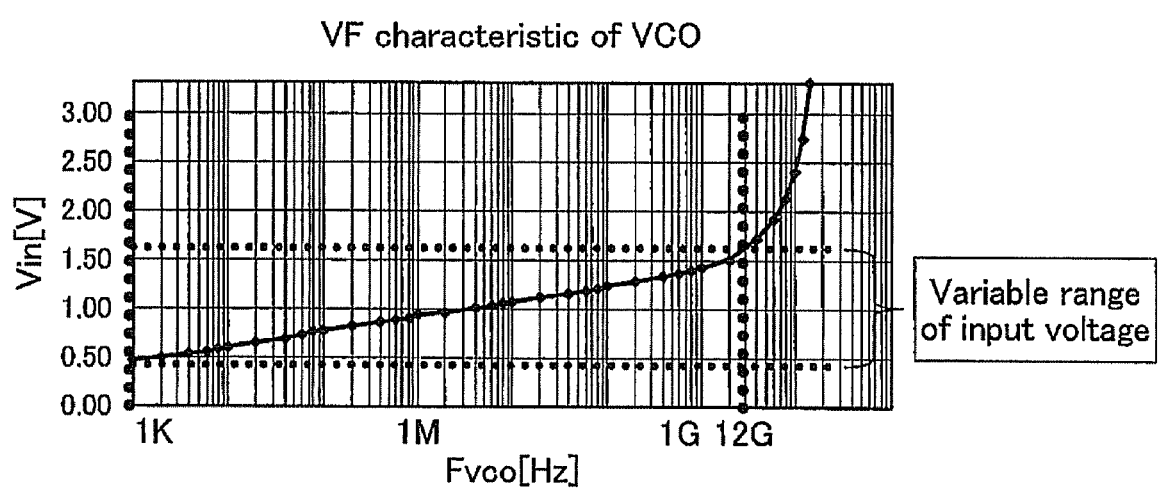
FIG. 3 is a graph showing a VF characteristic of the voltage control oscillator.

FIG. 3 is a graph showing a VF characteristic of the voltage control oscillator 276 with a voltage value Vin [V] input into the voltage control oscillator 276 as ordinate and a frequency value Fvco [Hz] of a clock signal output from the voltage control oscillator 276 as abscissa. The voltage control oscillator 276 is capable of outputting the operation clock signal Fclk-A having a frequency range of 1 KHz to 12 GHz without requiring range switching. The voltage control oscillator 276 provided in the PLL circuit 270 does not require range switching in the frequency range of 1 KHz to 12 GHz and thus advantageously prevents potential problems like an instantaneous voltage drop and a hazard caused by the range switching. Another advantage is no requirement for range switching-related control by the CPU 100. The voltage control oscillator 276 is preferably designed as a circuit requiring no range switching in a whole frequency range of the clock signal supplied to the CPU 100.

FIG. 4A is a block diagram showing the internal structure of the power supply voltage controller 230. The power supply voltage controller 230 has a correlation coefficient operator 232, a frequency command value operator 234, and a set voltage value operator 236. FIG. 4B shows arithmetic expressions in the three operators 232, 234, and 236. The correlation coefficient operator 232 calculates a correlation coefficient K from the upper voltage limit value Emax, the lower voltage limit value Emin, the upper frequency value Fmax, and the lower frequency value Fmin. The frequency command value operator 234 calculates a frequency command value Fclk from the reference frequency dividing value M, the frequency dividing value N, and a reference frequency value Fsc stored in the reference frequency value storage element 226. The reference frequency value storage element 226 is connected to the bus 700 (see FIG. 2) and stores the reference frequency value Fsc set by the CPU 100. The reference frequency value Fsc is set to have an identical frequency with the frequency fRCK0 of the original clock signal RCK0 generated by the reference oscillator 218. The set voltage value operator 236 calculates the set voltage value Evdd from the correlation coefficient K, the frequency command value Fclk, and the lower frequency value Fmin. The correlation coefficient K, the frequency command value Fclk, and the set voltage value Evdd are given as:

$$K=(Emax-Emin)/(\log(Fmax)-\log(Fmin)) \quad (3)$$

$$Fclk=Fsc \cdot N/M \quad (4)$$

When Fclk<Fmin, $$Evdd=Emin \quad (5)$$

When Fmin≤Fclk≤Fmax, $$Evdd=K \cdot (\log(Fclk)-\log(Fmin))+Emin \quad (6)$$

When Fmax<Fclk, $$Evdd=Emax \quad (7)$$

FIG. 4C is a graph showing a variation in set voltage value Evdd against the frequency command value Fclk, with the common logarithm of the frequency command value Fclk as abscissa and the set voltage value Evdd as ordinate. As clearly understood from the above arithmetic expressions (2) and (4), the frequency command value Fclk is set equal to the frequency fFclk-A of the operation clock signal Fclk-A output from the voltage control oscillator 276. As clearly understood from the above arithmetic expressions (3) and (6), the set voltage value Evdd is set to be proportional to the common logarithm of the frequency command value Fclk. This enables the set voltage value Evdd to be determined corresponding to the frequency command value Fclk even when the operation clock signal Fclk-A and the frequency command value Fclk are changed in a wide frequency range. When the frequency command value Fclk is smaller than the lower frequency value Fmin, the set voltage value Evdd is set equal to the lower voltage limit value Emin. When the frequency command value Fclk is greater than the upper frequency value Fmax, the set voltage value Evdd is set equal to the upper voltage limit value Emax (see the arithmetic expressions (5) and (7)). This defines the upper limit and the lower limit of the power supply voltage Evdd-A supplied to the CPU 100 and the other circuits in the computer system.

FIG. 5 is a table showing calculation results of the set voltage value Evdd from concrete frequency values substituted in the frequency command value Fclk. In this table, the lower frequency value Fmin, the upper frequency value Fmax, the upper voltage limit value Emax, and the lower voltage limit value Emin are respectively set equal to 1 K [Hz], 1 G [Hz], 5.0 [V], and 0.8 [V]. The set voltage value Evdd is output in a range of 0.8 [V] as the lower limit and 5.0 [V] as the upper limit to be proportional to the common logarithm of the frequency command value Fclk.

Figure 6A:
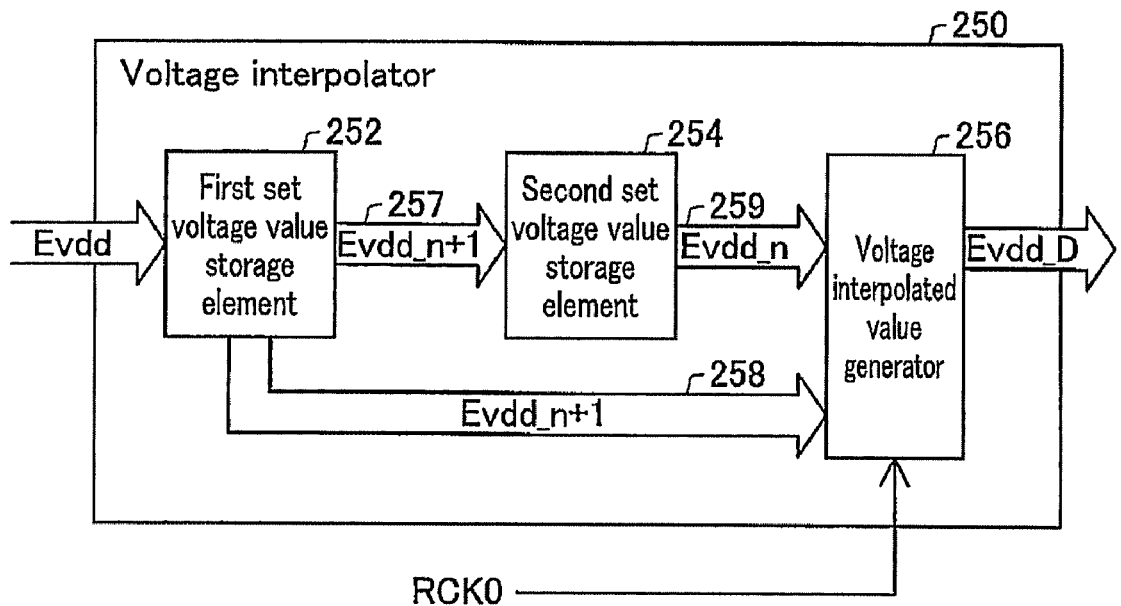
FIG. 6A is a block diagram showing the internal structure of the voltage interpolator.

FIG. 6A is a block diagram showing the internal structure of the voltage interpolator 250. The voltage interpolator 250 includes a first set voltage value storage element 252, a second set voltage value storage element 254, and a voltage interpolated value generator 256. The first set voltage value storage element 252 stores the set voltage value Evdd sequentially supplied from the power supply voltage controller 230 (see FIG. 2). The set voltage value Evdd is changed according to the reference frequency dividing value M and the frequency dividing value N. In response to a change in set voltage value Evdd, the first set voltage value storage element 252 supplies a previous set voltage value Evdd_n before the change to the second set voltage storage element 254, and sequentially updates the previous set voltage value Evdd_n before the change to a new set voltage value Evdd_n+1 after the change. The second set voltage value storage element 254 stores the previous set voltage value Evdd_n before the change (prior to the update) supplied from the first set voltage storage element 252. While the first set voltage value storage element 252 stores the new set voltage value Evdd_n+1 after the change, the second set voltage value storage element 254 stores the previous set voltage value Evdd_n before the change.

Figure 6B:
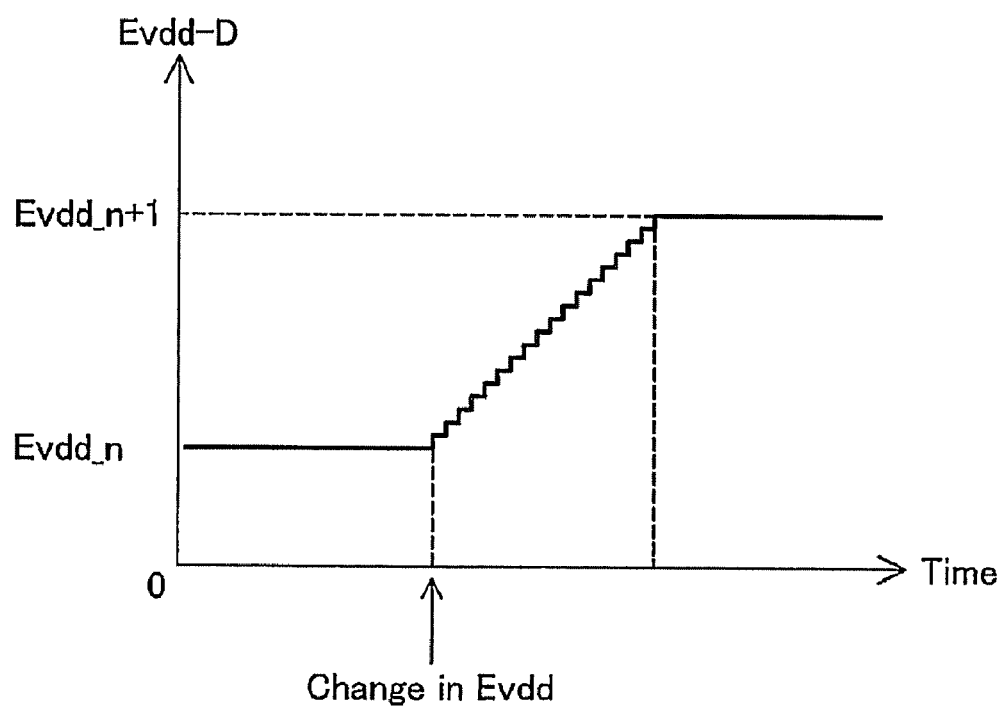
FIG. 6B is a graph showing a variation in set voltage interpolated value Evdd-D output from the voltage interpolated value generator with elapse of time.

FIG. 6B is a graph showing a variation in set voltage interpolated value Evdd-D output from the voltage interpolated value generator 256 with elapse of time. In the case of no change in set voltage value Evdd, the voltage interpolated value generator 256 directly outputs the set voltage value Evdd_n+1 stored in the first set voltage value storage element 252 as the set voltage interpolated value Evdd-D. In the case of a change in set voltage value Evdd, on the other hand, the voltage interpolated value generator 256 compares the new set voltage value Evdd_n+1 after the change stored in the first set voltage value storage element 252 with the previous set voltage value Evdd_n before the change stored in the second set voltage value storage element 254 and sequentially outputs an interpolated value of these two set voltage values as the set voltage interpolated value Evdd-D. Namely the set voltage interpolated value Evdd-D is output according to a linear change curve to gradually change from the previous set voltage value Evdd_n before the change to the new set voltage value Evdd_n+1 after the change. An example of a concrete procedure of generating the set voltage interpolated value Evdd-D will be described. The original clock signal RCK0 is supplied to the voltage interpolated value generator 256. Then the voltage interpolated value generator 256 adds or subtracts a predetermined value to or from the previous set voltage value Evdd_n before the change at each clock of the original clock signal RCK0, and outputs the result of the addition or the subtraction as the set voltage interpolated value Evdd-D. The addition or the subtraction of the predetermined value is repeated until the set voltage interpolated value Evdd-D becomes equal to the new set voltage value Evdd_n+1 after the change. The output of the set voltage interpolated value Evdd-D gives a constant variation in power supply voltage Evdd-A per unit time. The DA converter 260 (FIG. 2) converts the set voltage interpolated value Evdd-D as a digital signal into the power supply voltage Evdd-A as an analog signal and supplies the power supply voltage Evdd-A to the CPU 100 and the other circuits in the computer system.

Even in the case of an abrupt change in set voltage value Evdd caused by a significant change of the reference frequency dividing value M or the frequency dividing value N, the set voltage interpolated value Evdd-D output from the voltage interpolator 250 has a moderate change. This arrangement desirably prevents an abrupt change of the power supply voltage Evdd-A supplied to the CPU 100 and the other circuits in the compute system.

The CPU 100 (FIG. 2) of the embodiment is equivalent to the microprocessor of the invention. The power supply voltage controller 230 (FIGS. 2 and 4A), the voltage interpolator 250 (FIGS. 2 and 6A), and the DA converter 260 of the embodiment correspond to the power supply voltage generator of the invention. The reference oscillator 218 (FIG. 2), the reference frequency divider 220 (FIG. 2), and the PLL circuit 270 (FIG. 2) of the embodiment correspond to the operation clock signal generator of the invention. The DA converter 260 of the embodiment is equivalent to the voltage generator of the invention.

Figures 7A, 7B:
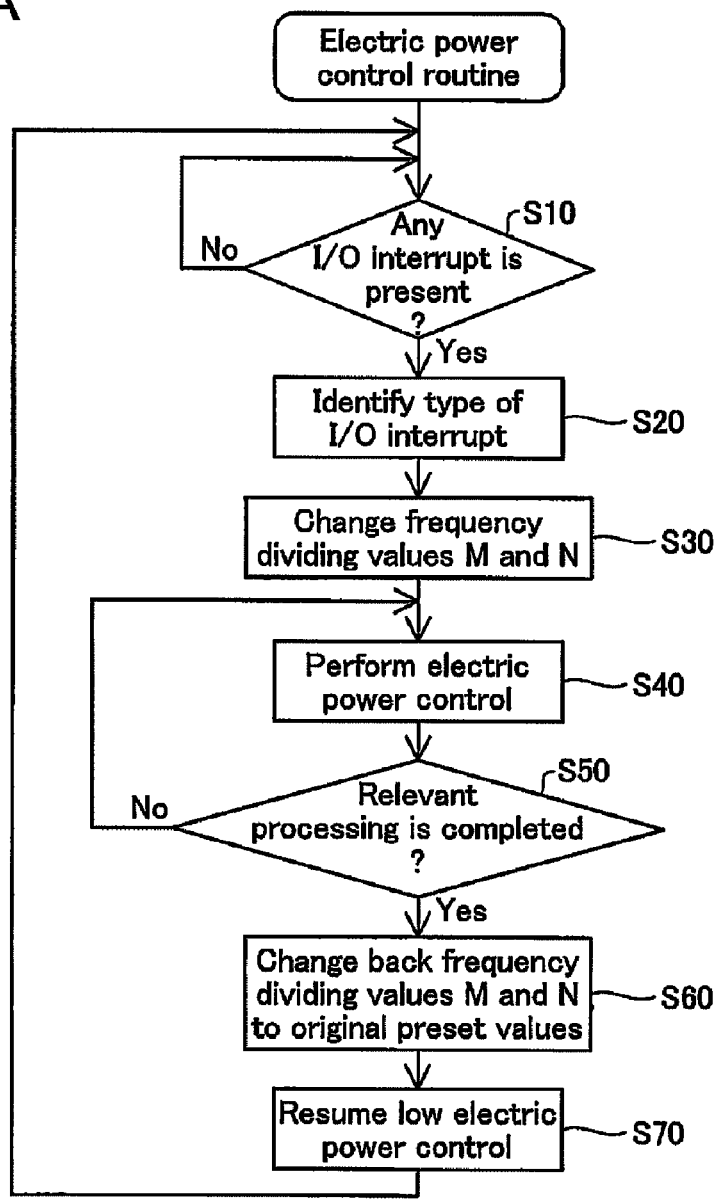
FIG. 7A is a flowchart showing an electric power control routine executed by the OS installed in the computer system.
FIG. 7B is a table showing an example of the frequency dividing values M and N corresponding to the respective types of I/O interrupts.

FIG. 7A is a flowchart showing an electric power control routine executed by the OS installed in the computer system. The electric power control routine monitors the presence of an I/O interrupt at step S10. Typical examples of the I/O interrupt are a keyboard entry, an audio output, and a video output. In the presence of no I/O interrupt, the electric power control routine keeps monitoring the presence of any I/O interrupt. In the presence of any I/O interrupt, on the other hand, the electric power control routine identifies the type of the I/O interrupt at step S20.

FIG. 7B is a table showing an example of the frequency dividing values M and N corresponding to the respective types of I/O interrupts. At step S30 in the electric power control routine of FIG. 7A, the CPU 100 (FIG. 2) refers to the table of FIG. 7B and changes the frequency dividing values M and N corresponding to the identified type of the I/O interrupt. The electric power control routine then performs electric power control to supply the power supply voltage Evdd-A representing the set voltage value Evdd corresponding to the changed frequency dividing values M and N to the CPU 100 and the other circuits in the computer system at step S40. The electric power control routine subsequently determines whether a relevant process requiring the electric power control (for example, video output process) is completed at step S50. The electric power control is continued until completion of the relevant processing. On completion of the relevant processing, the electric power control routine changes back the frequency dividing values M and N to their original preset values at step S60, resumes low electric power control at a level in the presence of no I/O interrupt at step S70, and goes back to step S10 to monitor the presence of another I/O interrupt.

Figures 8A, 8B:
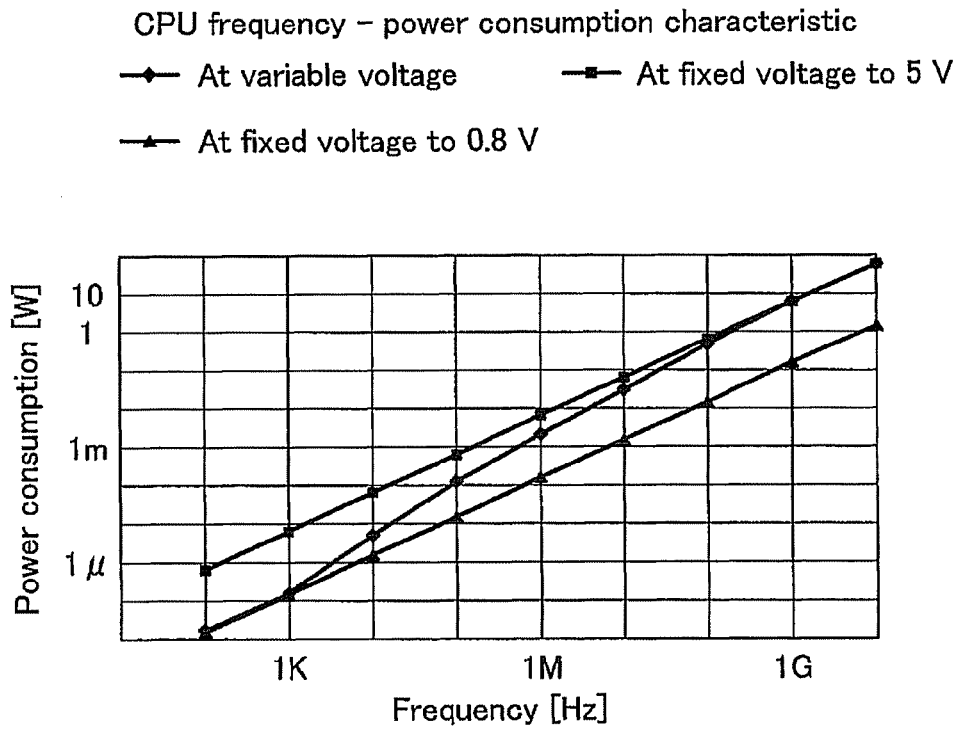
FIG. 8A is a graph showing a variation in power consumption against frequency value of the operation cock signal Fclk-A.
FIG. 8B is a table showing a comparison between the power consumption at a fixed power supply voltage to 5.0 [V] and the power consumption at a variable power supply voltage Evdd-A, as well as a reduction rate of the power consumption.

FIG. 8A is a graph showing a variation in power consumption against frequency value of the operation cock signal Fclk-A. This graph is given as a double logarithmic plot. FIG. 8B is a table showing a comparison between the power consumption at a fixed power supply voltage to 5.0 [V] and the power consumption at a variable power supply voltage Evdd-A, as well as a reduction rate of the power consumption. Such comparison proves a significant reduction of the power consumption at the variable power supply voltage Evdd-A in conjunction with the frequency value of the operation clock signal Fclk-A, compared with the power consumption at the fixed power supply voltage to 5.0 [V].

The circuit structure of the first embodiment enables the set voltage value Evdd to be proportional to the common logarithm of the frequency command value Fclk. Even in the case of a significant variation in operation clock signal supplied to the CPU 100 in a wide frequency range, this arrangement enables determination of the value of the power supply voltage supplied to the CPU 100 and the other circuits in the computer system. This arrangement also ensures a moderate change in set voltage interpolated value Evdd-D output from the voltage interpolator 250 and thereby effectively prevents an abrupt change in power supply voltage Evdd-A supplied to the CPU 100 and the other circuits in the computer system.

B. Second Embodiment

Figure 9:
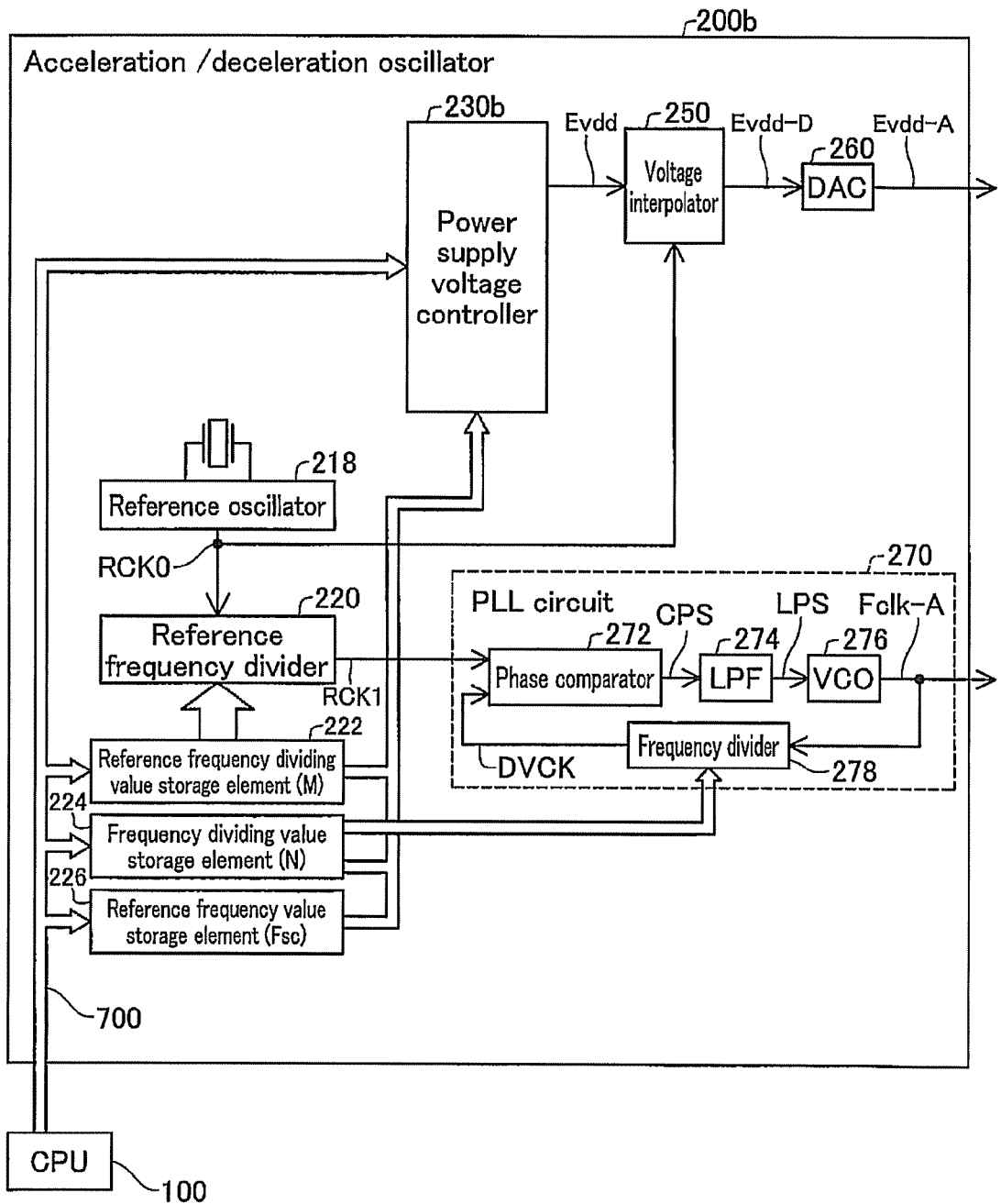
FIG. 9 is a block diagram showing the internal structure of an acceleration/deceleration oscillator in a second embodiment.

FIG. 9 is a block diagram showing the internal structure of an acceleration/deceleration oscillator 200b in a second embodiment. The acceleration/deceleration oscillator 200b of the second embodiment has the similar internal structure to that of the acceleration/deceleration oscillator 200 in the first embodiment shown in FIG. 2, except omission of the upper voltage limit value storage element 210, the lower voltage limit value storage element 212, the upper frequency value storage element 214, and the lower frequency value storage element 216 and a different internal structure of a power supply voltage controller 230b.

Figure 10A:
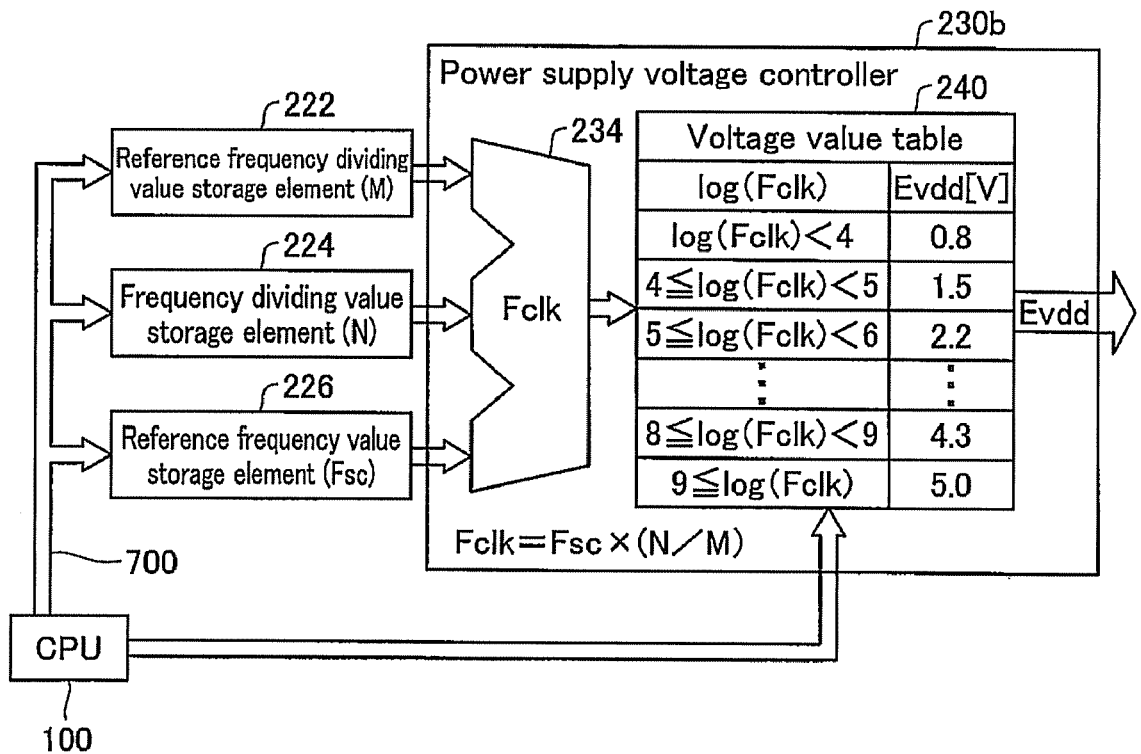
FIG. 10A is a block diagram showing the internal structure of the power supply voltage controller in the second embodiment.

FIG. 10A is a block diagram showing the internal structure of the power supply voltage controller 230b in the second embodiment. The power supply voltage controller 230b includes a frequency command value operator 234 and a voltage value table 240. The frequency command value operator 234 calculates the frequency command value Fclk in the same manner as the first embodiment. The voltage value table 240 has the frequency command value Fclk as the input and specifies the set voltage value Evdd as the output according to the logarithm of the frequency command value Fclk. The voltage value table 240 is connected to the CPU 100 via the bus 700 to allow an arbitrary change in relationship between the input frequency command value Fclk and the output set voltage value Evdd.

Figure 10B:
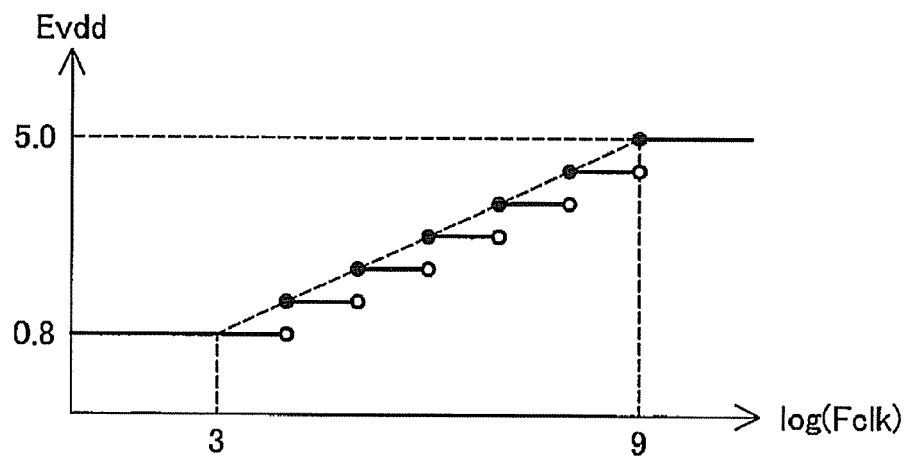
FIG. 10B is a graph showing a variation in set voltage value Evdd against the frequency command value Fclk in the second embodiment.

FIG. 10B is a graph showing a variation in set voltage value Evdd against the frequency command value Fclk in the second embodiment. The set voltage value Evdd specified according to the voltage value table 240 changes stepwise. In a broad sense, the set voltage value Evdd is proportional to the logarithm of the frequency command value Fclk.

The use of the voltage value table 240 in the second embodiment enables determination of the value of the power supply voltage supplied to the CPU 100 and the other circuits in the computer system even in the case of a significant variation in operation clock signal supplied to the CPU 100 in a wide frequency range, as in the circuit structure of the first embodiment.

C. Modified Examples

The present invention is not limited to the embodiments described hereinabove, and may be reduced to practice in various other ways without departing from the spirit thereof. Modifications such as the following are possible, for example.

C1. Modified Example 1

In the embodiments described above, the power supply voltage Evdd-A is proportional to the logarithm of the frequency command value Fclk (the frequency value fFclk-A of the operation clock signal Fclk-A). The power supply voltage Evdd-A may be set against the logarithm of the frequency command value Fclk according to any arbitrary relation other than the proportional relation (for example, a curved relation).

C2. Modified Example 2

In the circuit structure of the above embodiment, the frequency command value Fclk is used as the input of the set voltage value operator 236 (FIG. 4A). The input of the set voltage value operator 236 is not restricted to the frequency command value Fclk but may alternatively be the frequency value fFclk-A of the operation clock signal Fclk-A.

C3. Modified Example 3

In the embodiment described above, the electric power control is performed according to the type of the I/O interrupt. One modified procedure may set the frequency dividing values M and N according to the type of an application activated in the information processing apparatus and perform electric power control with the set frequency dividing values M and N.

C4. Modified Example 4

The above embodiments use the base-10 common logarithm. The base 10 common logarithm may be replaced by a logarithm with a base of any arbitrary positive real number other than 1.

C5. Modified Example 5

In the circuit structure of the embodiment, the voltage interpolator 250 outputs the linearly changing set voltage interpolated value Evdd-D (see FIG. 6B). The set voltage interpolated value Evdd-D may alternatively change according to any arbitrary preset change curve. The change curve is not restricted to a linear curve, but may be, for example, a convex-upward curve, a concave-upward curve, or an S-shaped curve.

C6. Modified Example 6

In the embodiment described above, the CPU 100 is used as the microprocessor of the invention. The microprocessor of the invention is, however, not restricted to the CPU 100 but may be any other microprocessor executing diversity of data processing, for example, a GPU (graphic processing unit) as an image processing processor.

C7. Modified Example 7

In the circuit structure of the embodiment, the acceleration/deceleration oscillator 200 controls the frequency and the voltage of the CPU 100. The whole acceleration/deceleration oscillator 200 or part of the acceleration/deceleration oscillator 200 (for example, the acceleration/deceleration oscillator 200 other than the DA converter 260) may be actualized by a semiconductor integrated circuit. The semiconductor integrated circuit having the functions of the whole or part of the acceleration/deceleration oscillator 200 may be incorporated in the circuit structure of a one-chip CPU or DSP to be constructed as a one-chip structure. Mounting such a one-chip structure on a small-size portable device or any device requiring extremely low power consumption, such as an electronic paper, desirably reduces the power consumption and easily elongates the life of the device.

C8. Modified Example 8

The present invention is applicable to various kinds of devices. For example, the present invention is implemented in a motor in any of various devices such as fan motors, clocks (for driving the hands), drum type washing machines (single rotation), jet coasters, vibrating motors, and the like. Where the present invention is implemented in a fan motor, the various advantages mentioned previously (low power consumption, low vibration, low noise, minimal rotation irregularity, low heat emission, and long life) is particularly notable. Such fan motors can be employed, for example, as fan motors for various devices such as digital display devices, vehicle on-board devices, fuel cell type PCs, fuel cell type digital cameras, fuel cell type video cameras, fuel cell type mobile phones, various other fuel cell-powered devices, and projectors. The motor of the present invention may also be utilized as a motor for various types of household electric appliances and electronic devices. For example, a motor in accordance with the present invention may be employed as a spindle motor in an optical storage device, magnetic storage device, polygon mirror drive, or the like. The motor of the present invention may also be utilized as a motor for a movable body or a robot.

Figure 11:
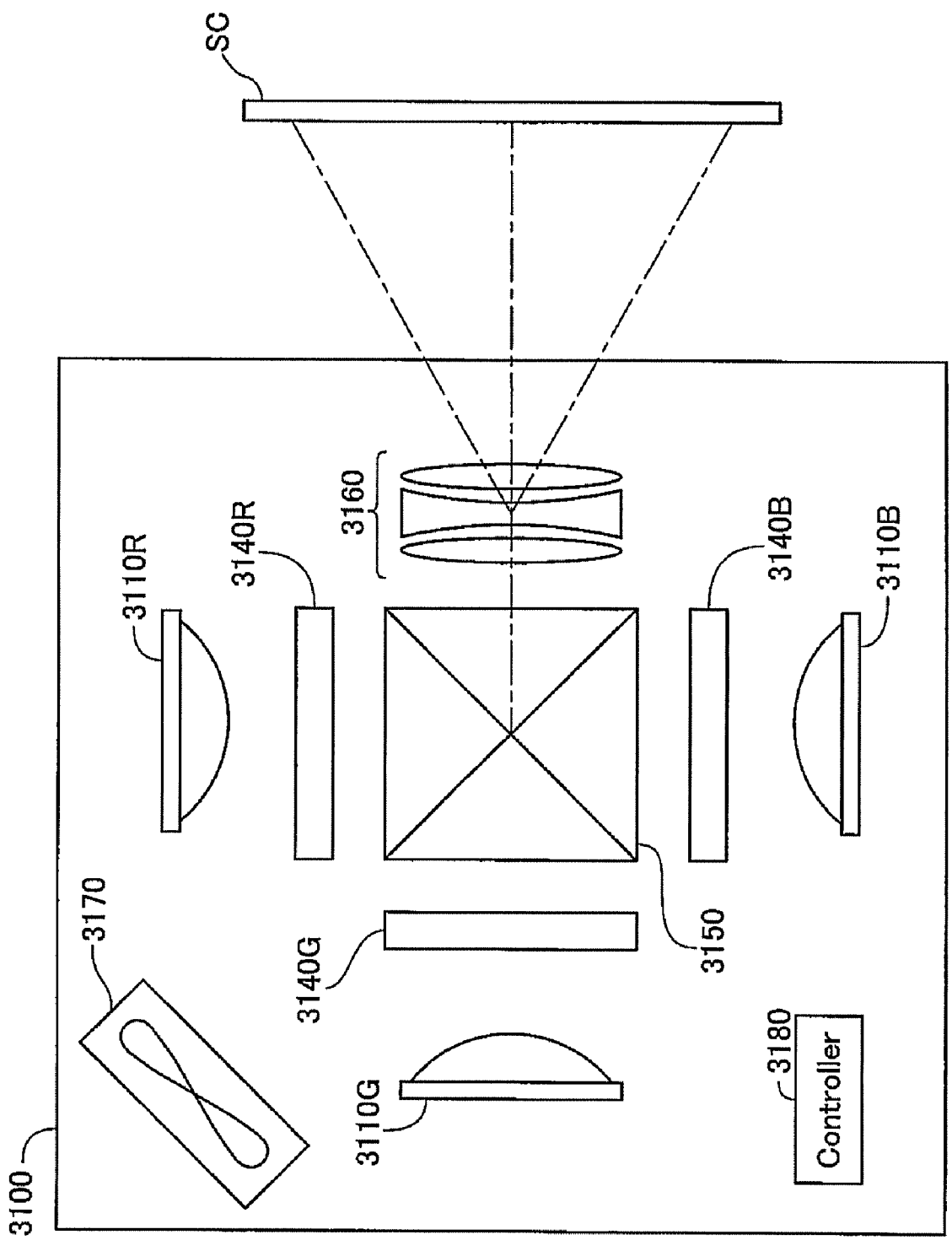
FIG. 11 is an illustration depicting a projector which utilizes a motor equipped with an information processing apparatus according to the present invention.

FIG. 11 is an illustration depicting a projector which utilizes a motor equipped with an information processing apparatus according to the present invention. This projector 3100 has three light sources 3110R, 3110G, 3110B for emitting light of the three colors red, green, and blue; liquid crystal light valves 3140R, 3140G, 3140B for modulating light of the three colors; a cross dichroic prism 3150 for synthesizing modulated light of the three colors; a projection lens system 3160 for projecting light synthesized from the three colors onto a screen SC; a cooling fan 3170 for cooling the interior of the projector; and a controller 3180 for controlling the entire projector 3100. Any of the various brushless motors described above may be used as the motor for driving the cooling fan 3170.

Figure 12A:
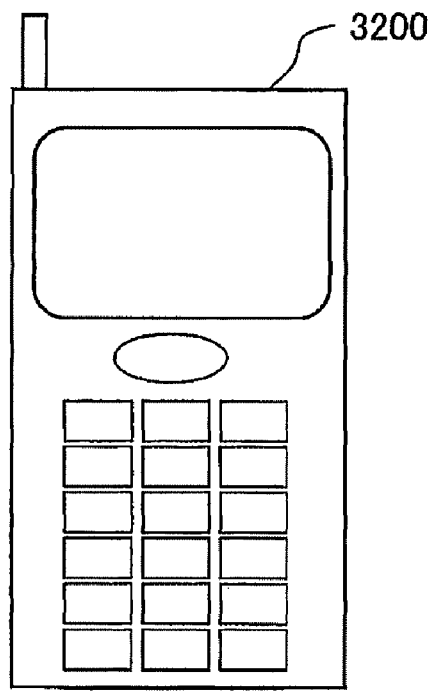
FIGS. 12A to 12C illustrate a fuel cell type mobile phone which utilizes a motor equipped with an information processing apparatus according to the present invention.
Figure 12B:
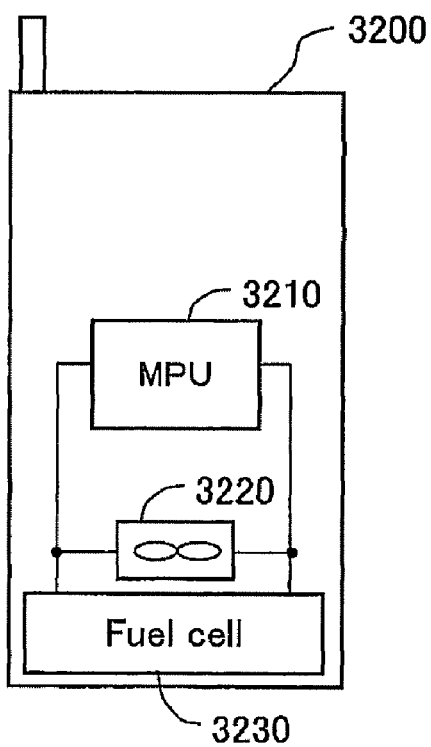
Figure 12C:
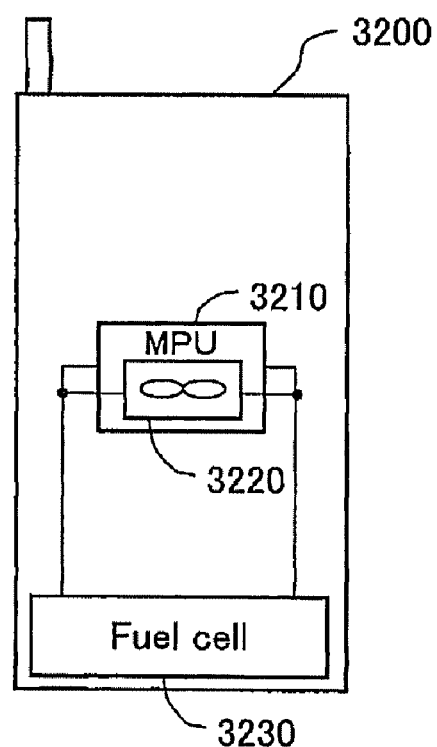

FIGS. 12A to 12C illustrate a fuel cell type mobile phone which utilizes a motor equipped with an information processing apparatus according to the present invention. FIG. 12A shows an exterior view of a mobile phone 3200, and FIG. 12B shows an example of internal configuration. The mobile phone 3200 includes an MPU 3210 for controlling operation of the mobile phone 3200; a fan 3220; and a fuel cell 3230. The fuel cell 3230 supplies power to the MPU 3210 and to the fan 3220. The fan 3220 blows air into the mobile phone 3200 from the outside in order to supply air to the fuel cell 3230, or in order to expel moisture evolved in the fuel cell 3230 from the inside of the mobile phone 3200 to the outside. The fan 3220 may also be positioned on the MPU 3210 as shown in FIG. 12C, to cool the MPU 3210. Any of the various brushless motors described above can be used as the motor for driving the fan 3220.

Figure 13:
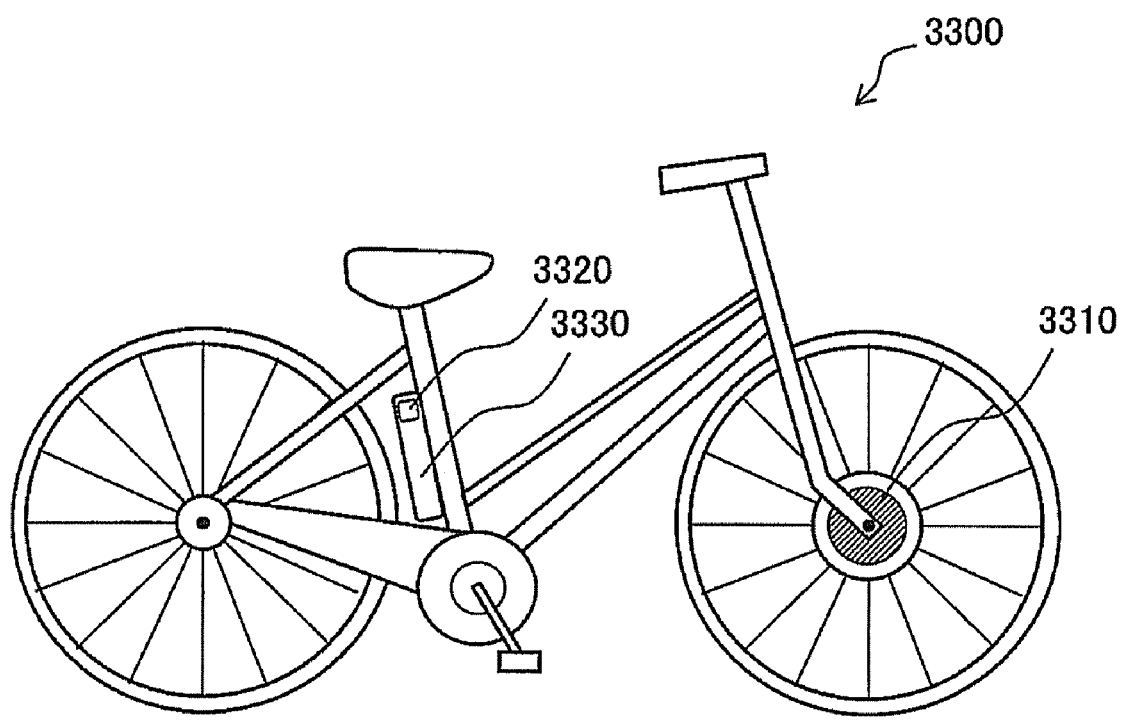
FIG. 13 is an illustration depicting an electrically powered bicycle (power assisted bicycle) as one example of a movable body that utilizes a motor/generator equipped with an information processing apparatus according to the embodiments of the present invention.

FIG. 13 is an illustration depicting an electrically powered bicycle (power assisted bicycle) as one example of a movable body that utilizes a motor/generator equipped with an information processing apparatus according to the embodiments of the present invention. This bicycle 3300 is provided with a motor 3310 on its front wheel; and with a control circuit 3320 and a rechargeable battery 3330 disposed on the frame below the saddle. The motor 3310 uses power from the rechargeable battery 3330 to drive the front wheel, thereby assisting travel. During braking, regenerative power from the motor 3310 is used to charge the rechargeable battery 3330. The control circuit 3320 is a circuit for controlling driving and regeneration of the motor. Any of the various brushless motors described above can be used as the motor 3310.

Figure 14:
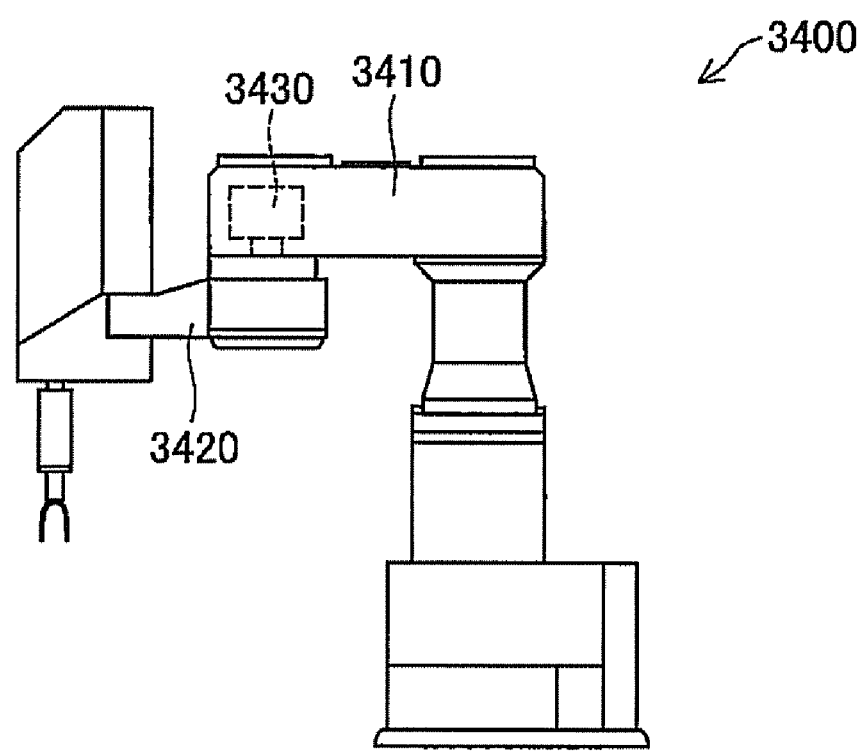
FIG. 14 is an illustration showing an example of a robot which utilizes a motor equipped with an information processing apparatus according to the embodiments of the present invention.

FIG. 14 is an illustration showing an example of a robot which utilizes a motor equipped with an information processing apparatus according to the embodiments of the present invention. This robot 3400 has first and second arms 3410, 3420, and a motor 3430. This motor 3430 is used during horizontal rotation of the second arm 3420 as the driven member. Any of the various brushless motors described above can be used as the motor 3430.

Figure 15:
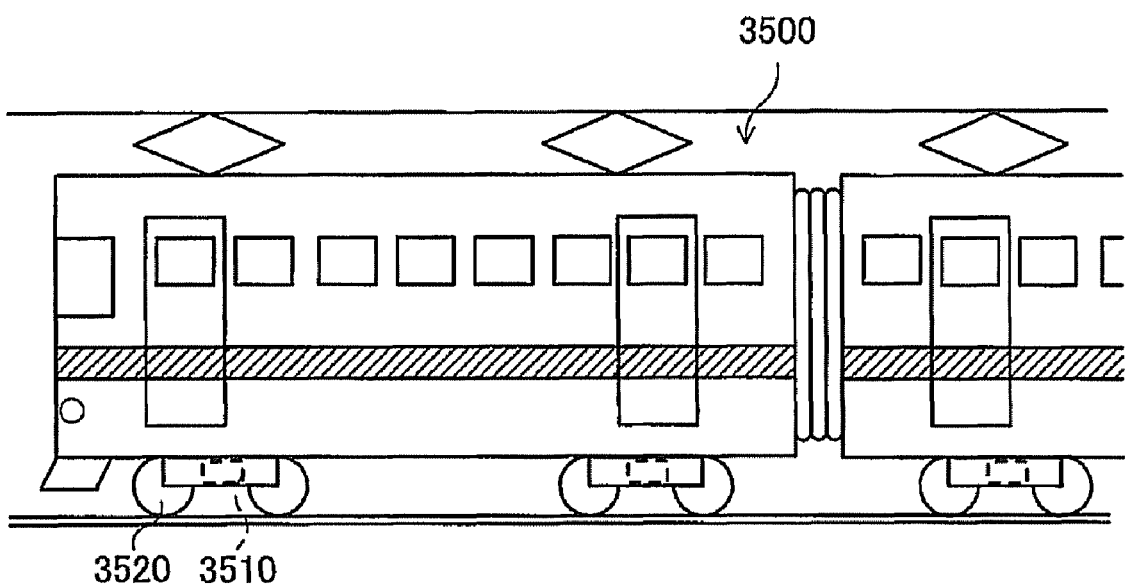
FIG. 15 is an explanatory drawing showing a railway vehicle using a motor equipped with an information processing apparatus according to the embodiment of this invention.

FIG. 15 is an explanatory drawing showing a railway vehicle using a motor equipped with an information processing apparatus according to the embodiment of this invention. This railway vehicle 3500 has a motor 3510 and a wheel 3520. This motor 3510 drives the wheel 3520. Furthermore, the motor 3510 is used as a generator when the railway vehicle 3000 is applied the brake, and regenerates power. As this motor 3510, it is possible to use the various types of brushless motor described above.

What is claimed is:

1. An information processing apparatus equipped with a microprocessor, comprising:
   an operation clock signal generator that generates a frequency-variable operation clock signal supplied to the microprocessor; and
   a power supply voltage generator that determines a value of a power supply voltage to be supplied to the microprocessor according to a logarithm of a frequency of the operation clock signal and generates the power supply voltage, wherein
   the power supply voltage generator determines the value of the power supply voltage to be proportional to the logarithm of the frequency of the operation clock signal according to following equations:

$$K=(E\text{max}-E\text{min})/(\log(F\text{max})-\log(F\text{min})) \quad (1)$$

When Fclk<Fmin, $$E\text{vdd}=E\text{min} \quad (2)$$

When Fmin≦Fclk≦Fmax, $$E\text{vdd}=K\cdot(\log(F\text{clk})-\log(F\text{min}))+E\text{min} \quad (3)$$

When Fmax<Fclk, $$E\text{vdd}=E\text{max} \quad (4)$$

wherein Fclk is the frequency of the operation clock signal,
   Fmin is a lower frequency value,
   Fmax is an upper frequency value,
   Evdd is the value of the power supply voltage,
   Emin is a lower voltage limit value of the power supply voltage, and
   Emax is an upper voltage limit value of the power supply voltage.

2. The information processing apparatus according to claim 1, wherein
   the power supply voltage generator changes the value of the power supply voltage according to a preset change curve that defines the change of the power supply voltage value according to a change in frequency of the operation clock signal.

3. The information processing apparatus according to claim 1, wherein
   the operation clock signal generator has a PLL circuit including a voltage control oscillator configured to produce a whole frequency range of the operation clock signal without range switching.

4. A semiconductor integrated circuit, comprising:
   an operation clock signal generator that generates a frequency-variable operation clock signal supplied to a microprocessor; and
   a power supply voltage controller that determines a value of a power supply voltage to be supplied to the microprocessor according to a logarithm of a frequency of the operation clock signal and gives an instruction including the specified value of the power supply voltage to a voltage generator to generate the power supply voltage, wherein
   the power supply voltage generator determines the value of the power supply voltage to be proportional to the logarithm of the frequency of the operation clock signal according to following equations:

$$K=(E\text{max}-E\text{min})/(\log(F\text{max})-\log(F\text{min})) \quad (1)$$

When Fclk<Fmin, $$E\text{vdd}=E\text{min} \quad (2)$$

When Fmin≦Fclk≦Fmax, $$E\text{vdd}=K\cdot(\log(F\text{clk})-\log(F\text{min}))+E\text{min} \quad (3)$$

When Fmax<Fclk, $$E\text{vdd}=E\text{max} \quad (4)$$

wherein Fclk is the frequency of the operation clock signal,
   Fmin is a lower frequency value,
   Fmax is an upper frequency value,
   Evdd is the value of the power supply voltage,
   Emin is a lower voltaqe limit value of the power supply voltage, and
   Emax is an upper voltage limit value of the power supply voltage.

5. An electric motor, comprising the information processing apparatus according to claim 1.

6. An electric motor, comprising the semiconductor integrated circuit according to claim 4.

7. A device, comprising the motor according to claim 5.

8. The device according to claim 7, wherein
   the device is an electronic device.

9. The device according to claim 7, wherein
   the device is a projector.

10. The device according to claim 7, wherein
    the device is a moving body.

11. The device according to claim 7, wherein
    the device is a robot.

* * * * *